(12) United States Patent
Bar et al.

(10) Patent No.: US 10,460,459 B2
(45) Date of Patent: Oct. 29, 2019

(54) STITCHING FRAMES INTO A PANORAMIC FRAME

(71) Applicant: HumanEyes Technologies Ltd., Neve Ilan (IL)

(72) Inventors: Anton Bar, Jerusalem (IL); Yitzchak Tulbovich, Modiln Elit (IL); Shmuel Fine, Rehovot (IL)

(73) Assignee: HumanEyes Technologies Ltd., Neve Ilan (IL)

( * ) Notice: Subject to any disclaimer, the term of this patent is extended or adjusted under 35 U.S.C. 154(b) by 0 days.

(21) Appl. No.: 15/560,495

(22) PCT Filed: Dec. 12, 2016

(86) PCT No.: PCT/IL2016/051329
§ 371 (c)(1),
(2) Date: Sep. 22, 2017

(87) PCT Pub. No.: WO2017/115349
PCT Pub. Date: Jul. 6, 2017

(65) Prior Publication Data
US 2018/0063513 A1    Mar. 1, 2018

Related U.S. Application Data

(60) Provisional application No. 62/274,321, filed on Jan. 3, 2016, provisional application No. 62/274,317, filed on Jan. 3, 2016.

(51) Int. Cl.
*G06T 7/33* (2017.01)
*G03B 37/04* (2006.01)
(Continued)

(52) U.S. Cl.
CPC ............. *G06T 7/344* (2017.01); *G03B 35/08* (2013.01); *G03B 37/04* (2013.01); *G06T 3/0018* (2013.01);
(Continued)

(58) Field of Classification Search
CPC .. H04N 13/282; H04N 13/111; H04N 13/122; H04N 13/344; H04N 13/239;
(Continued)

(56) References Cited

U.S. PATENT DOCUMENTS

2006/0083440 A1* 4/2006 Chen .................. H04N 5/23238
382/284
2006/0257053 A1  11/2006 Boudreau et al.
(Continued)

FOREIGN PATENT DOCUMENTS

WO    WO 2012/052936    4/2012
WO    WO 2015/085406    6/2014
(Continued)

OTHER PUBLICATIONS

Moritz (Extrinsic Calibration of a Fisheye Multi-Camera Setup Using Overlapping Fields of View—Published in 2014 IEEE Intelligent Vehicles Symposium (IV), Jun. 8-11, 2014. Dearborn, Michigan, USA).*
(Continued)

*Primary Examiner* — Christopher S Kelley
*Assistant Examiner* — Nasim N Nirjhar

(57) ABSTRACT

A method of stitching frames captured at multiple viewing angles comprising: receiving a set of frames captured by imagers, identifying in each of pairs of neighboring frames, each neighboring frame is captured about the same time as the other from an imager having an overlapping field of view with another. For each overlapping area a center connecting axis connecting between centers of respective the pair of
(Continued)

neighboring frames is identified, a motion gradient for each frame of the pair of neighboring frames is calculated, pixels of the pair of neighboring frames in the at least one overlapping area are adapted based on corresponding values from the motion gradient along the center connecting axis, the pair of adapted neighboring frames into a panoramic frame which at least partly imaging an environment surrounding the common center is stitched.

16 Claims, 10 Drawing Sheets

(51) Int. Cl.

| | | |
|---|---|---|
| *G06T 7/269* | (2017.01) | |
| *H04N 13/344* | (2018.01) | |
| *H04N 13/111* | (2018.01) | |
| *H04N 13/282* | (2018.01) | |
| *G06T 3/00* | (2006.01) | |
| *G06T 19/00* | (2011.01) | |
| *G03B 35/10* | (2006.01) | |
| *H04N 13/122* | (2018.01) | |
| *G06T 7/10* | (2017.01) | |
| *G03B 35/08* | (2006.01) | |
| *H04N 13/239* | (2018.01) | |

(52) U.S. Cl.
CPC .............. *G06T 7/10* (2017.01); *G06T 7/269* (2017.01); *G06T 19/006* (2013.01); *H04N 13/111* (2018.05); *H04N 13/122* (2018.05); *H04N 13/282* (2018.05); *H04N 13/344* (2018.05); *G06T 2207/10012* (2013.01); *H04N 13/239* (2018.05)

(58) Field of Classification Search
CPC ........ G03B 35/10; G03B 37/04; G06T 7/269; G06T 7/344; G06T 19/006; G06T 3/0018; G06T 2207/10012
See application file for complete search history.

(56) References Cited

U.S. PATENT DOCUMENTS

| | | |
|---|---|---|
| 2006/0268131 A1 | 11/2006 | Cutler |
| 2010/0207961 A1 | 8/2010 | Zomet |
| 2012/0133780 A1 | 5/2012 | Zhang et al. |
| 2013/0216128 A1 | 8/2013 | Zomet |
| 2014/0104378 A1* | 4/2014 | Kauff ..................... H04N 5/247 348/38 |
| 2014/0267596 A1 | 9/2014 | Geerds |
| 2014/0300693 A1 | 10/2014 | Hirata et al. |
| 2015/0054913 A1* | 2/2015 | Annau .................... G11B 27/11 348/36 |
| 2015/0116453 A1 | 4/2015 | Hirata et al. |
| 2015/0124049 A1 | 5/2015 | Kimura |
| 2015/0162048 A1 | 6/2015 | Hirata et al. |
| 2017/0070674 A1* | 3/2017 | Thurow ................. H04N 7/181 |
| 2019/0019299 A1 | 1/2019 | Bar et al. |

FOREIGN PATENT DOCUMENTS

| | | |
|---|---|---|
| WO | WO 2017/115348 | 7/2017 |
| WO | WO 2017/115349 | 7/2017 |

OTHER PUBLICATIONS

International Preliminary Report on Patentability dated Jul. 12, 2018 From the International Bureau of WIPO Re. Application No. PCT/IL2016/051328. (8 Pages).

International Preliminary Report on Patentability dated Jul. 12, 2018 From the International Bureau of WIPO Re. Application No. PCT/IL2016/051329. (13 Pages).

International Search Report and the Written Opinion dated Apr. 14, 2017 From the International Searching Authority Re. Application No. PCT/IL2016/051329. (27 Pages).

International Search Report and the Written Opinion dated Apr. 20, 2017 From the International Searching Authority Re. Application No. PCT/IL2016/051328. (14 Pages).

* cited by examiner

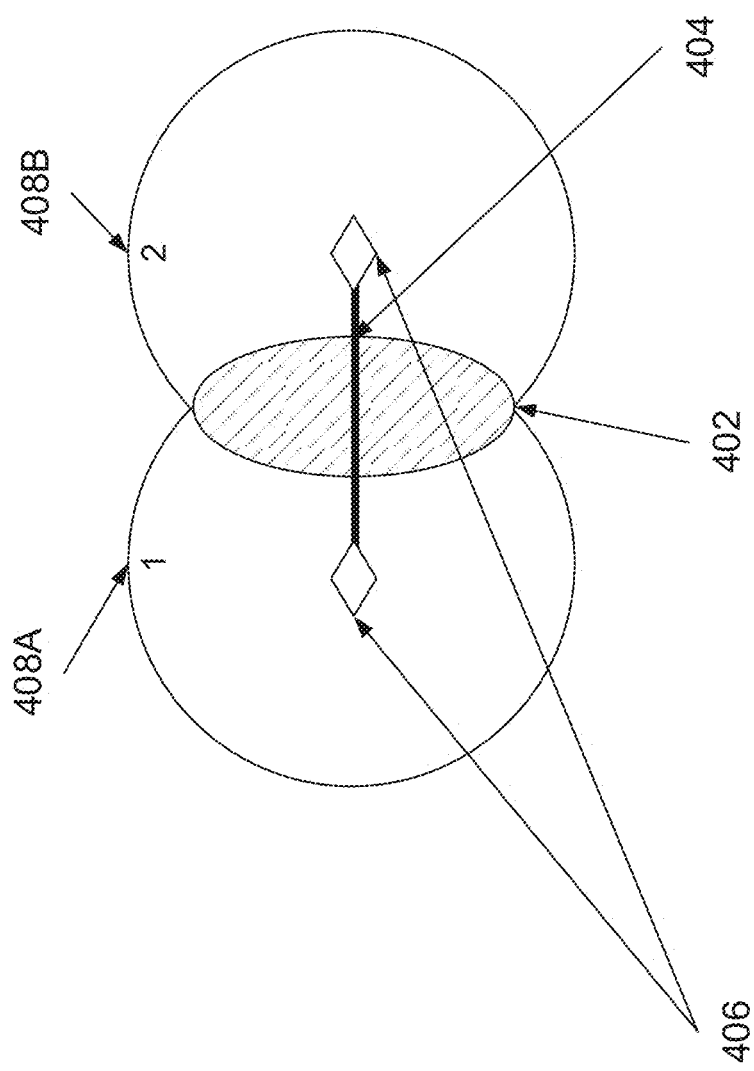

STITCHING FRAMES INTO A PANORAMIC FRAME

RELATED APPLICATIONS

This application is a National Phase of PCT Patent Application No. PCT/IL2016/051329 having International filing date of Dec. 12, 2016, which claims the benefit of priority under 35 USC § 119(e) of U.S. Provisional Patent Application Nos. 62/274,321 and 62/274,317, both filed on Jan. 3, 2016. The contents of the above applications are all incorporated by reference as if fully set forth herein in their entirety.

BACKGROUND

The present invention, in some embodiments thereof, relates to image processing and, more specifically, but not exclusively, to stitching of frames.

Virtual Reality (VR) is a special type of image or video content. VR, as its name suggests, is designed to replace the reality in order to provide the viewer with immersive sensation of the recorded content, including video and audio. The viewer uses a special type of display glasses, commonly referred to as VR headsets, VR goggles or VR glasses. The VR headset effectively blocks the viewer's natural vision and replaces it by a recorded or live-broadcasted content.

VR content is different than standard digital content designed to be presented on a flat screen, because VR is designed to replace the natural vision. VR is designed to be presented for a wide field of view (FOV) while providing stereo vision.

SUMMARY

According to some embodiments of the present invention, there is provided a method of stitching a plurality of frames captured at multiple viewing angles by a plurality of imagers mounted around a common center into a panoramic frame imaging, at least partly, an environment surrounding the common center. The method comprises receiving a set of a plurality of frames captured at multiple viewing angles by a plurality of imagers mounted around a common center region to image an environment surrounding the common center region, identifying in each of a plurality of pairs of neighboring frames from the plurality of frames at least one overlapping area, each pair of neighboring frames comprises frames captured about the same time by two imagers from the plurality of imagers, the two imagers having overlapping fields of view, for each at least one overlapping area: identifying a center connecting axis connecting between centers of respective the pair of neighboring frames, calculating a motion gradient for each frame of the pair of neighboring frames, values of the motion gradient increase towards a lateral edge of a respective the frame, adapting pixels of the pair of neighboring frames in the at least one overlapping area based on corresponding values from the motion gradient along the center connecting axis, and stitching the pair of adapted neighboring frames into a panoramic frame which at least partly imaging an environment surrounding the common center.

Optionally, the panoramic frame is a left eye panoramic frame and the plurality of imagers are intertwined with a plurality of additional imagers capturing a plurality of additional frames which are combined into a right eye panoramic frame The method further comprises combining the right eye panoramic frame with the left eye panoramic frame for creating a stereoscopic frame.

More optionally, members of the plurality of imagers and the plurality of additional frames are alternately arranged along a virtual circle encircling the common center.

Optionally, the panoramic frame is a right eye panoramic frame and the plurality of imagers are intertwined with a plurality of additional imagers capturing a plurality of additional frames which are combined into a left eye panoramic frame. The method further comprises combining the left eye panoramic frame with the right eye panoramic frame for creating a stereoscopic frame.

Optionally, the plurality of imagers are arranged along a virtual circle encircling the common center; wherein each one of the plurality of imagers is mounted such that an optical axis thereof is tilted in relation to an axis passing through the common center and a tangential point of an origin of a field of view of a respective the imager.

Optionally, the panoramic frame is a 360 degrees spherical panorama frame imaging the environment around the common center.

More optionally, the panoramic frame is used as one of two of frames comprising a stereoscopic frame.

Optionally, the method is repeated for adapting respective the at least one overlapping area in each frame of each of a plurality of sequentially captured sets.

Optionally, further comprising estimating a projection of a visual representation of the plurality of frames onto a sphere skeleton.

Optionally, the at least one overlapping area is identified using parameters from at least one calibration model defined for at least one of the plurality of imagers.

More optionally, the at least one calibration model is defined for each one of the plurality of imagers according to at least one member of a group consisting of a principal point parameter, a focal length parameter, and a fisheye distortion parameter.

More optionally, the at least one calibration model comprises a fish-eye correction matrix and an extrinsic camera calibration matrix which map coordinates of pixels to corrected coordinates defined according to symmetry axes of an image plane of respective the imager.

More optionally, in each of the plurality of frames, the at least one overlapping area is calculated based on a combined matrix generated according to the fish-eye correction matrix and the extrinsic camera calibration matrix are combined into a combined matrix used for calculating the at least one overlapping area overlap between each two consequent frames by projecting them onto a sphere so that each pixel becomes a 3D vector and correcting the 3D vectors according to the combined, full calibration matrix.

Optionally, each one of the plurality of imagers is a camera comprising a fish eye lens.

Optionally, each one of the plurality of imagers is calibrated using a Camera-Rig Calibration.

Optionally, the adapting comprises shifting pixels located in the overlapping area towards the lateral edge along the respective the axis.

More optionally, the method further comprises correcting a plurality of blank pixels formed as an outcome of the shifting by interpolation.

According to some embodiments of the present invention, there is provided a system of stitching a plurality of frames captured at multiple viewing angles by a plurality of imagers mounted around a common center into a panoramic frame imaging, at least partly, an environment surrounding the common center. The system comprises an interface adapted to receive a set of a plurality of frames captured about the same time at multiple viewing angles by a plurality of imagers mounted around a common center region to image an environment surrounding the common center region, a code store adapted to store a code, a processor adapted to execute the code for: identifying in each of a plurality of pairs of neighboring frames from the plurality of frames at least one overlapping area, each pair of neighboring frames comprises frames captured about the same time by two imagers from the plurality of imagers, the two imagers having overlapping fields of view, for each at least one overlapping area, identifying a center connecting axis connecting between centers of respective the pair of neighboring frames, calculating a motion gradient for each frame of the pair of neighboring frames, values of the motion gradient increase towards a lateral edge of a respective the frame, adapting pixels of the pair of neighboring frames in the at least one overlapping area based on corresponding values from the motion gradient along the center connecting axis, and stitching the pair of adapted neighboring frames into a panoramic frame which at least partly imaging an environment surrounding the common center.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 4 is a schematic illustration imaging the estimated overlapping areas and axis extending between two centers of neighboring imagers that acquired the frames being adapted for stitching, in accordance with some embodiments of the present invention.

DETAILED DESCRIPTION

Figure 1:
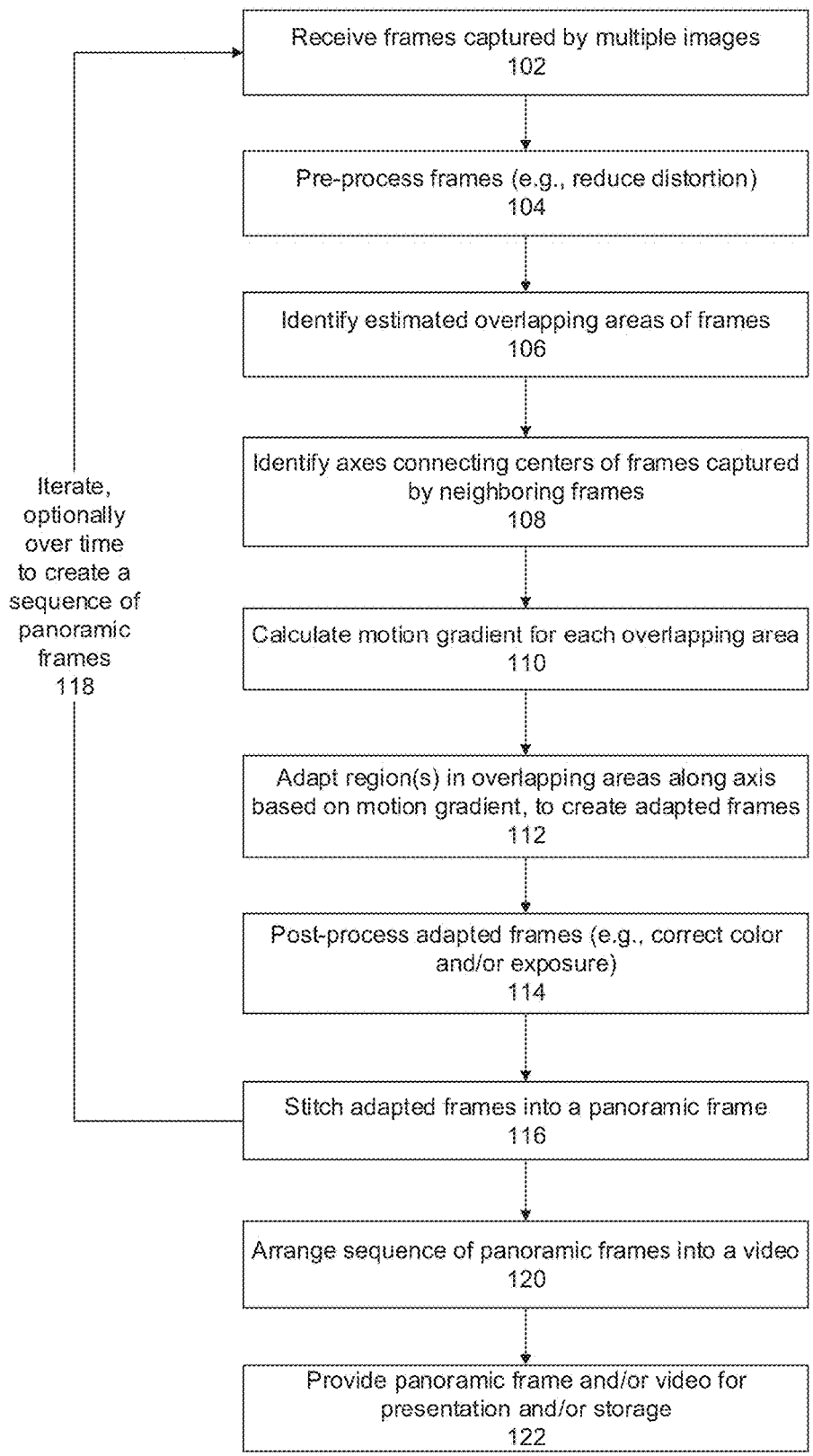
FIG. 1 is a flowchart of a method of stitching frames captured at multiple viewing angles around a common center region into a panoramic frame, in accordance with some embodiments of the present invention.

The present invention, in some embodiments thereof, relates to image processing and, more specifically, but not exclusively, to stitching of frames.

An aspect of some embodiments of the present invention relates to systems and/or methods (e.g., code executed by a processor of a computing device) for stitching frames or images (for brevity, referred to herein interchangeably) captured at multiple viewing angles, optionally around a common center region, by multiple imagers (e.g. cameras, image sensors) arranged into a panoramic frame or panoramic frame image that depicts the environment surrounding the common center region, for brevity also referred to herein a common center. The stitching is performed to reduce visibility of the stitching seams, and to create an improved panoramic frame viewing experience to the user, which more closely resembles the captured surrounding environment.

The frames to be stitched by embodiments of the present invention may be preprocessed (i.e., before the stitching) for alignment and registration. Overlapping areas between two consequent frames captured by having fields of view which image a common portion of an environment, referred to herein also as neighboring imagers, are identified. The overlapping areas may not necessarily be identified from an analysis of an overlapping area in the fields of view but rather estimated using external methods.

Optionally, the overlapping areas are estimated by projecting a visual representation of the frames onto a virtual sphere skeleton model. Alternatively or additionally, the overlapping areas are estimated based on a calibration model (e.g., a mathematical model) defined for one or both of the imagers that capture the overlapping frames. The calibration model may be defined based on principal point parameter(s), focal length parameter(s), and/or fisheye distortion parameter(s).

Fine correction of the alignment and registration is performed within the overlapping areas. Axes connecting centers of pairs of neighboring frames captured by neighboring imagers are identified. Each connecting axis passes through a respective identified overlapping area. A motion gradient is calculated for each overlapping area, such that the motion value increases towards the lateral edge of each respective frame of the overlapping area (and away from the center of the field of view, which is optionally a fish eye field of view). The motion gradient is optionally calculated by an optical flow analysis of pixels at least at the overlapping areas or portion thereof.

Region(s) of each frame in the respective overlapping area are adapted according to the motion gradient along each respective axis, to create a set of adapted frames. The regions may be adapted by shifting pixels towards the lateral edge of each respective frame along the respective axis where the shift intensity is determined according to the motion gradient (the more the pixel is closer to the edge, the stronger is the shift. Blank pixels formed during the shifting may be filled in, optionally by interpolation of their values, for example, based on neighboring pixels. The adapted frames are stitched into the panoramic frame.

The systems and/or methods described herein provide a technical solution to the technical problem of how to reduce the visibility of seams in a panoramic frame that depicts the environment surrounding the common center when the panoramic frame is created by combining frames captured at multiple viewing angles. The stitched frames may be frames of a VR file. Such VR files may be used in virtual reality systems, for example, presented to a user within a VR headset for viewing VR videos. The frames acquired for stitching together are captured by different cameras, which have different perspectives and/or different characteristics such as focus, exposure, white balance. The lenses used by the imagers (e.g., wide and/or fish-eye lenses) may apply visual distortions, such as barrel, pincushion and vignette, which create additional challenges in stitching the frames. A sub technical problem may be stitching of the frames captured by the different cameras, which have different characteristics and changing orientation (e.g. do to minor movements of fixed or adjustable cameras), in a manner to decrease or eliminate visibility of the seams. Visible seams reduce the natural looking or real feeling that the VR video is able to provide. Reducing or eliminating stitching distortions (e.g., in left and right panoramic frames, each designed to be viewed by respective left and right eyes) and/or different artifacts improves the VR video, by removing or reducing inconsistent, non-horizontal parallax, which would otherwise cause the viewer discomfort and/or nausea.

The systems and/or methods described herein tie mathematical operations (e.g., estimation of overlapping areas of frames, calculation of motion gradient(s), and frame stitching) to the ability of a processor to process digital images, for example, by stitching frames acquired at multiple viewing angles around a common center into a panoramic frame.

The systems and/or methods described herein relate to processing frames acquired at multiple viewing angles by imagers mounted around a common center. New data is created in the form of a panoramic frame, by stitching together the acquired frames. The panoramic frame may be stored in a memory device, and optionally played back to a user, for example, displayed in VT headgear. The panoramic frame may be incorporated in a video that includes multiple consequent panoramic frame.

The systems and/or methods described herein improve performance of a computer, for example, by using less memory and/or improving computation time in producing an improved digital image.

Accordingly, the systems and/or methods described herein are necessarily rooted in computer technology to overcome an actual technical problem arising in digital image processing.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
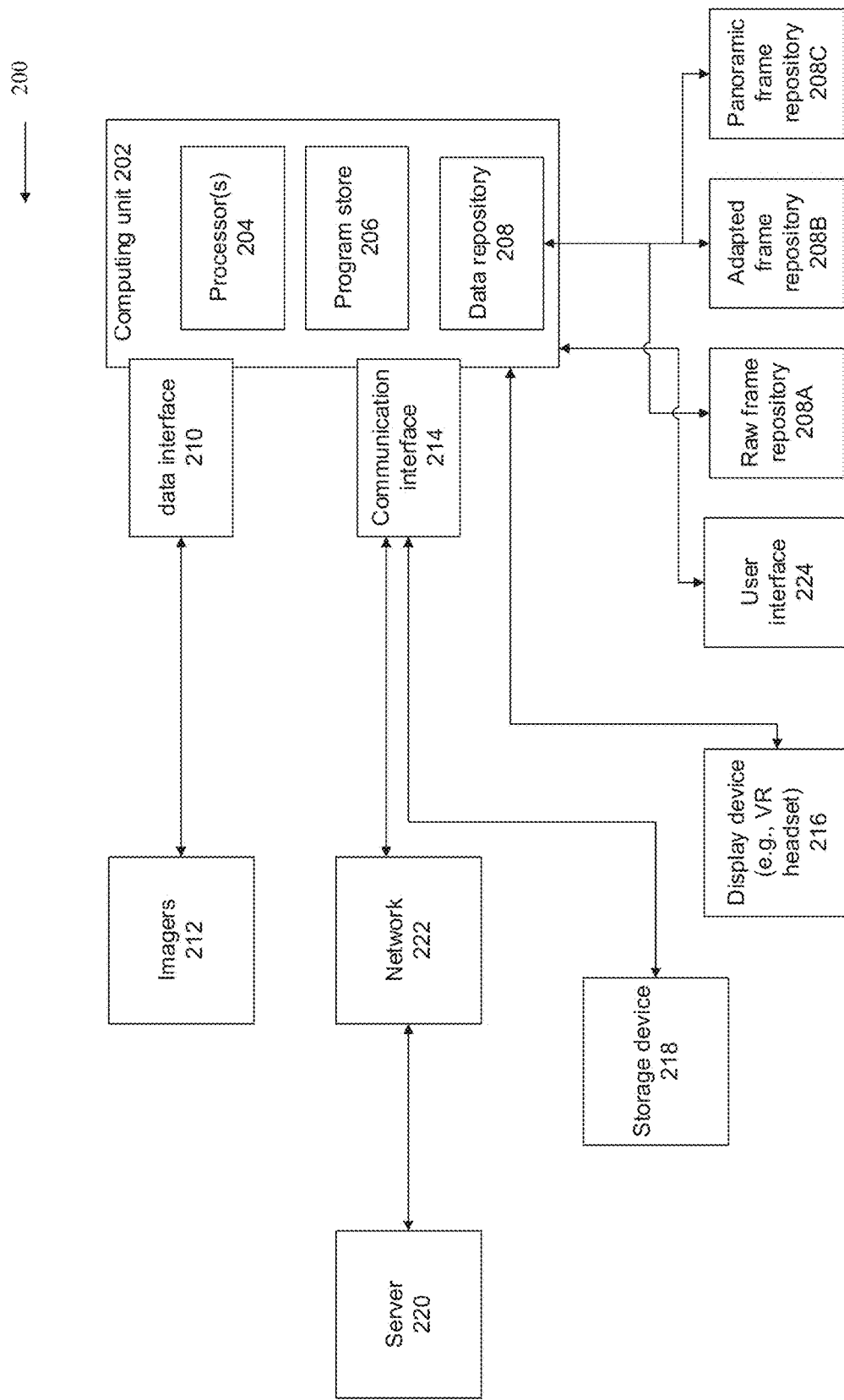
FIG. 2 is a block diagram of components of a system that stitches frames captured at multiple viewing angles into a panoramic frame, in accordance with some embodiments of the present invention.

Reference is now made to FIG. 1, which is a flowchart of a method of stitching frames captured at multiple viewing angles into a panoramic frame, in accordance with some embodiments of the present invention. The method adapts overlapping areas in frames according to values of a motion gradient in order to reduce visibility of stitching seams in the resulting panoramic frame. Reference is also made to FIG. 2, which is a block diagram of components of a system 200 that allows a user to capture individual panoramic frames or a video of a sequence of panoramic frames of an environment surrounding (at least in part) a common center region, using multiple viewing imagers each pointed toward a different angle around the common center region. The user may record the video for playback in a virtual reality setting, such as using a VR headset. The method of claim 1 may be implemented by system 200 of FIG. 2.

System 200 includes a computing unit 202 housed with imagers 212, for example a custom designed unit, referred to herein as a VR imaging device (see for example FIG. 3B which is an exemplary housing of a VR imaging device), or separate from a housing which includes the imagers 212, for instance a personal computer, a server, a mobile device, a wearable computer, or other implementations. Computing unit 202 includes one or more processor(s) 204, and a program store 206 storing code instructions for execution by processor(s) 204. The instructions are optionally to implement the method described in FIG. 1.

Processor(s) 204 may be, for example, a processing unit(s) (CPU), one or more graphics processing unit(s) (GPUs), field programmable gate array(s) (FPGA), digital signal processor(s) (DSP), and application specific integrated circuit(s) (ASIC). Processor(s) may be part of a processing unit that includes multiple processors (homogenous or heterogeneous) arranged for parallel processing, as clusters and/or as one or more multi core processing units.

Program store 206 store code instructions implementable by processor(s) 204, for example, a random access memory (RAM), read-only memory (ROM), and/or a storage device, for example, non-volatile memory, magnetic media, semiconductor memory devices, hard drive, removable storage, and optical media (e.g., DVD, CD-ROM).

Computing unit 202 includes or is in communication with a data repository 208, for example, a memory, a storage unit, a hard drive, an optical disc, a remote storage server, and/or a cloud server (e.g., accessed via a network connection). Data repository 208 may store the raw acquired frames (e.g., in raw frame repository 208A), store the frames adapted as described by the systems and/or methods described herein (e.g., in adapted frame repository 208B), and/or the created panoramic frames (e.g., in panoramic frame repository 208C).

Computing unit 202 includes a data interface 210 (e.g., physical, virtual and/or a software interface) for receiving frames acquired from each of multiple imagers 212 (e.g., digital cameras). Imagers 212 (e.g. red, green, blue (RGB) imagers) are arranged to acquire a set of frames that depict an environment, optionally at least 180 degrees, optionally 360 (horizontally and/or vertically) around a common center region, for example see FIG. 3A which is described in greater details below.

Optionally, imagers 212 are paired to capture frame for the left or right eyes, which may be presented to the different eyes, for example, using a VT headset. In such an embodiment, imagers may be divided to two groups, left eye group and right eye group. Members of the left eye group are in even places and members of the right eye group are in uneven places (assuming that places are distributed in a sequential order in a circle surrounding the common center region) or vice versa. In such embodiments, frames captured by imagers of the left eye group are stitched to form a left eye panoramic image and frames captured by imagers of the right eye group are stitched to form a right eye panoramic image. The stitching of each one of the left eye panoramic image and the right eye panoramic image is done separately, for instance as described below (overlapping areas are between frames captured by group members). The left eye panoramic image and the right eye panoramic image are combined to create a stereoscopic panoramic image. For example, in the arrangements 304 306 of FIG. 3A, the dashed rectangles may be members of the left eye group and the non-dashed rectangles are members of the right eye group.

Alternatively or additionally, imagers 212 capture frames that are displayed to both eyes simultaneously, for example, projected within a 180 degree theater.

Each one of the imagers 212 may have a wide angle lens designed to capture a wide field of view, for example, a fish eye lens. Exemplary imagers 212 are cameras with ultra-wide and/or vertical angle lenses that capture about 120 degrees horizontally and about 175 degree vertically, or other values.

The number of imagers 212 is selected to cover the designed environment (twice in embodiments wherein a stereoscopic panoramic frame is created), and may be based on the field of view that may be captured by the lenses of the cameras, for example, 4 imagers, or 8 imagers, 10 imagers, 16 imagers and/or any intermediate or larger number of imagers.

Figure 3A:
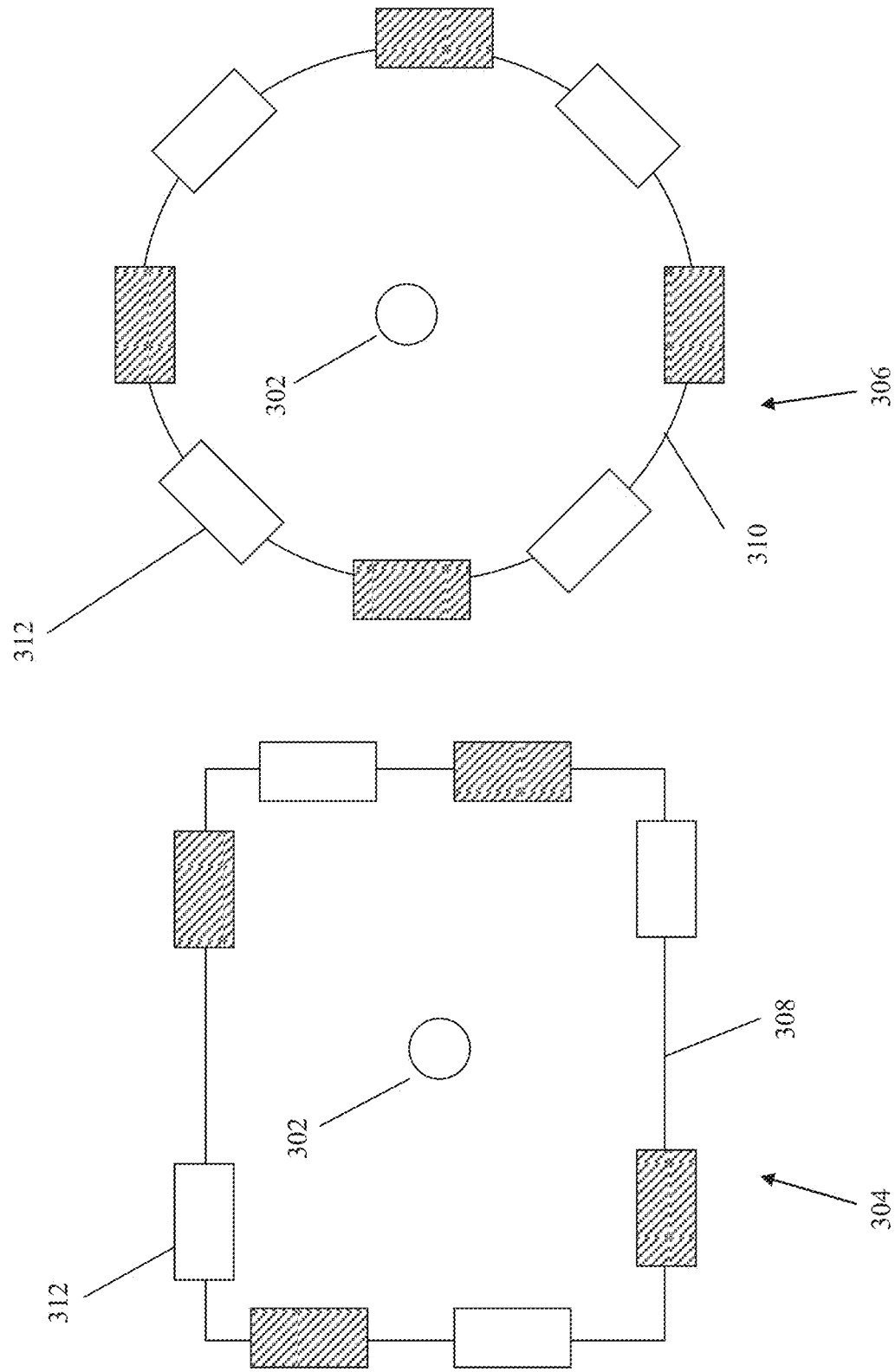
FIG. 3A is a schematic illustration of an exemplary arrangement of imagers capturing frames at multiple viewing angles that are stitched into the panoramic frame using the systems and/or methods described herein, in accordance with some embodiments of the present invention.
Figure 3B:
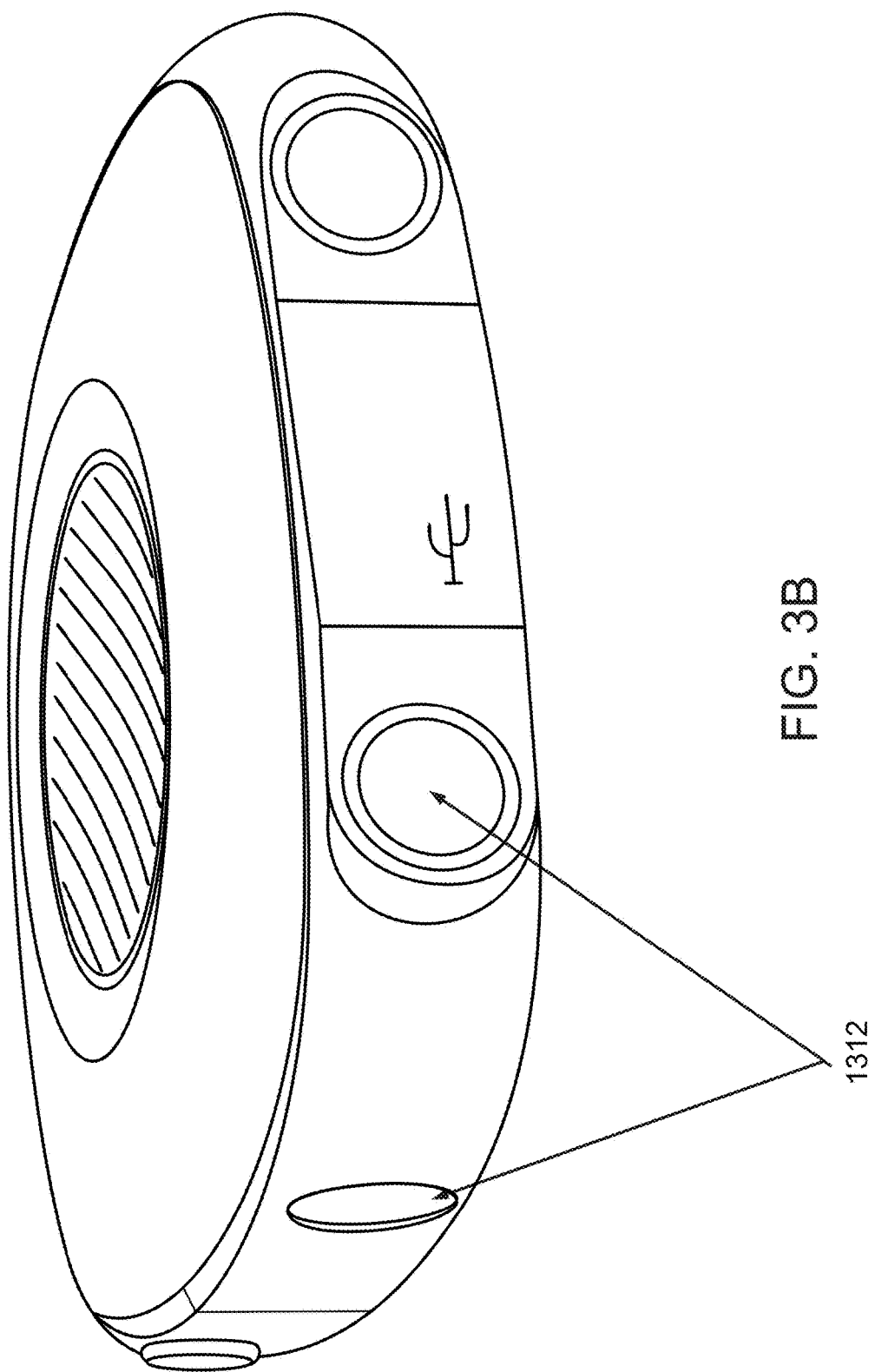
FIG. 3B is a schematic lateral illustration of a virtual reality (VR) imaging device having an arrangement of imagers for capturing frames at multiple viewing angles and for stitching the captured frames into a panoramic frame using methods described herein, in accordance with some embodiments of the present invention.

Reference is now made to FIG. 3A, which depicts exemplary implementations for the arrangement of imagers 312 (e.g., corresponding to imagers 212 as described with reference to FIG. 2), in accordance with some embodiments of the present invention. Imagers 312 are mounted around a common center 302. Imagers 312 are arranged to acquire frames at multiple viewing angles. The frames are stitched into a panoramic frame (using the systems and/or methods described herein) that depict the environment surrounding common center 302.

Each one of arrangements 304 and 306 includes eight imagers 312 arranged to cover 360 degrees around common center 302. Implementation 304 depicts imagers 312 arranged in a square 308 (or rectangular) format, including two imagers 312 per side of square 308, which may be paired to capture frames for the left and right eyes. See also FIG. 3B which is a lateral view of an exemplary quadratic housing with truncated corners of a custom designed unit that includes 4 pairs of lateral imagers 1312 where each pair is located at another truncated corner of the exemplary quadratic housing. Arrangement 306 includes imagers 312 arranged in a circle 310 (or oval) format, spaced apart along the circumference of circle 310. Imagers 312 may capture frames for the left and right eyes. It is noted that other implementation shapes may be used.

Figure 3C:
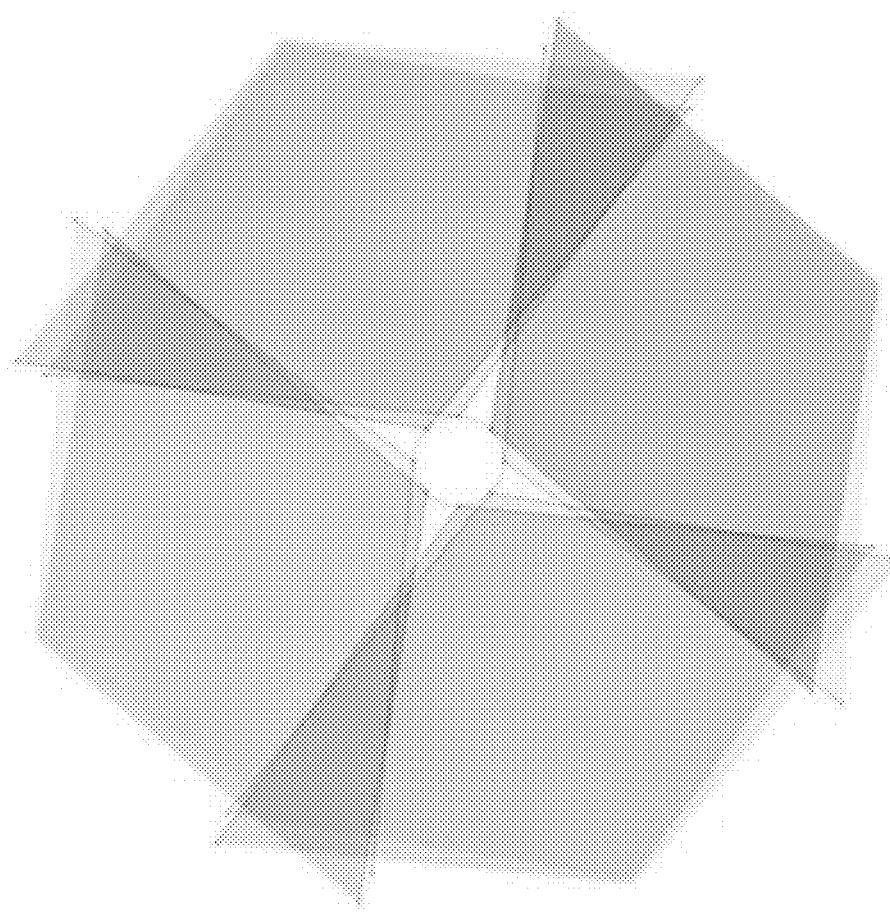
FIGS. 3C and 3D are schematic illustrations of an overlap between fields of view of imagers having, respectively, tilted optical axes and non-tilted optical axes in relation to a radius of a virtual circle passing via mounting points of the imagers, in accordance with some embodiments of the present invention.
Figure 3D:
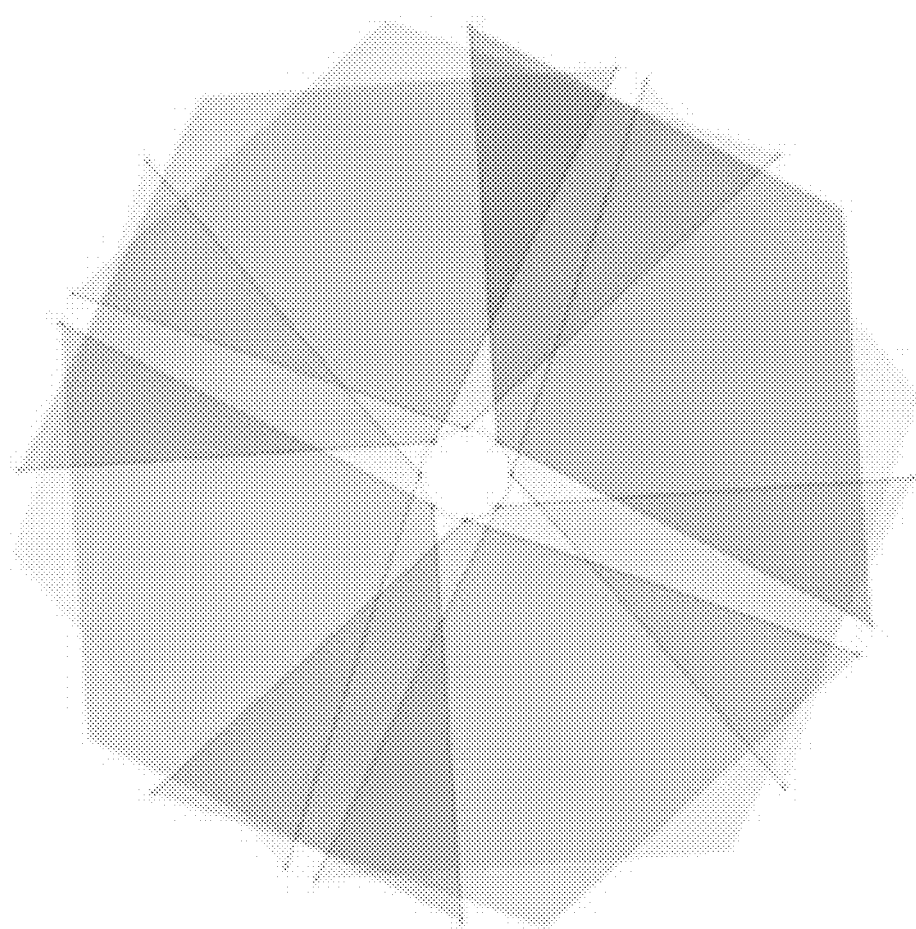

According to some embodiments of the present invention, imagers are divided to pairs wherein each pair is designed to capture a stereoscopic frame. In such embodiments, overlapping areas in pairs of stereoscopic frames are identified and used for creating a panoramic image is described below. For brevity, a stereoscopic frame is referred to herein as a frame and a pair of imagers designed to capture a stereoscopic frame is referred to herein as an imager. For example, a VR imaging device having an arrangement of pairs of imagers for capturing stereoscopic frames is used where the fields of view are as depicted in FIG. 3C. Optionally, optical axis each imager in a pair of imagers is tilted toward the other imager of the pair of imagers, for instance toward the optical axis thereof. Optionally, the tiling of the optical axis is in relation to an axis passing through the common center and through a respective tangential point of an origin point of the field of view of respective imager on a virtual circle passing via all origin points of the fields of view of all imagers, for example see the circle depicted in FIGS. 3C and 3D. Optionally, the tilting is between 20 and 30 degrees, for instance 22 degrees as depicted in FIG. 3C. The tilting of imagers reduces the overlapping areas between the fields of views. This can be seen when comparing the imagers in FIG. 3C which depicts an arrangement of imagers wherein each imager is tilted toward its paired imager with FIG. 3D which depicts another arrangement of imagers wherein the optical axis of each imager is aligned to continue a radius of a virtual circle passing via mounting points of all imagers, for instance the points of origin of the optical axes of the imagers. When comparing FIG. 3C with FIG. 3D one can see that the darker areas, which are intersections of the fields of view of imagers, are larger when the optical axes of the imagers are tilted as described above.

Implementations 304 and 306 may have a substantially disc shape, in which imagers 312 are arranged along a plane. It is noted that other implementation profiles may be used, for example, a sphere, or half-sphere.

Additional imagers 312 may be positioned to face up or down (not shown).

Computing unit 202 and imagers 312 may be housed within a casing based on implementations 304 and/or 306, for example, as a standalone portable unit, which may be used by consumers at home.

Referring now back to FIG. 2, computing unit 202 includes a communication interface 214 (e.g., physical, software, and/or virtual) to communicate with one or more external devices, to store and/or present the created panoramic frames (e.g., videos), for instance a Wi-Fi™ module or a Bluetooth™ module. Exemplary external devices include a personal display device 216 (e.g., a VR headset), a storage device 218 to store the videos for future playback, and a server 220 (e.g., web server, storage server, video server) that may be communicated with over a network 222. It is noted that the recorded videos may be publicly played, for example, projected onto a panoramic screen in a theater, in a room, or at home, for example, by a projector (not shown).

Computing unit 202 includes or is in communication with a user interface 224 (which may be integrated within a housing containing computing unit 202, implemented as software on a client terminal, and/or implemented as part of the display device displaying the panoramic frames), for example, a touchscreen, a keyboard, a mouse, and voice activated software using speakers and microphone. User interface 224 may access a code (e.g., stored on a client terminal and/or on computing unit 202) to customize the creation of the panoramic frames based on user inputs.

According to some embodiments of the present invention, the imagers are calibrated for calculating a camera calibration model for image alignment as well as reduction of parallax distortion. Optionally, the camera calibration model is calculated based on intrinsic parameters of each imager, for instance principal point parameter(s), focal length parameter(s), and/or fisheye distortion parameter(s) and optionally based on extrinsic parameter(s). For example, intrinsic parameters may include fisheye distortion parameters.

In use, the parameters may be calculated by placing imagers of the VR imaging device in front of a chessboard pattern while the VR imaging device is rotated and capturing sequence(s) of frames.

During calculation of a camera calibration model, which is optionally executed using processor(s) 204, corners of a pattern of n×m chessboard tiles are detected, for instance by finding a linear least squares homography of the pattern. A Gauss-Newton method may be applied to find the above imager parameters and rotations and translations of the imagers that yield the detected homographies for several views of chessboard. A Jacobian matrix is calculated and a quality criterion is calculated based on a mean square error method. This allows calibrating extrinsic parameters of a respective rig for the calculation of the camera calibration model, mutual rotations by the means of bundle adjustment on frames where distant objects are shot. For example, the extrinsic parameters are angles of rotation of each imager (e.g. optical axis angle) in 3D space (e.g. tilt, pan, and roll). Distant content may be detected by calculating an optical flow between each two imagers looking in the same direction by displaced horizontally (a stereo pair). Parallax of pairs of frames containing distant content should have a significantly lower parallax. Homographies may be detected by matching feature points, for instance using a scale-invariant feature transform (SIFT) process or a speeded up robust features (SURF) process. Rotations may be found by a Levenerg-Macart method. Jacobian matrixes are numerically approximated. Intrinsic parameters may not be changed at this stage. The calibration may be initially executed using twenty frames of the chessboard pattern per imager. Optionally, unclear frames with high pixel re-projection error of calibration corners are removed to assure only frames having a quality above a threshold are used for the calibration in order to ensure a low pixel re-projection error. As indicated above, the calibration is made on the corners of a checker board pattern item. It is optionally assumed that the board is not moving, and hence remains in fixed coordinates in world coordinate system (X-Y plane) with squares starting at (0,0,0). A bundle adjustment algorithm may be applied.

Optionally, the following pseudo code iteratively collects frames for calculating intrinsic parameters:

For each frame: when a chessboard is detected in the frame:
[RMS, K, DistortionCoeffs, rotation_vectors_of_cameras, translation_vectors_of_cameras]
=calibrate(board squares world-coordinates, board squares image coordinates
in ALL image that were collected so far, fix the skew to 0)
if (calibration succeeded) AND (RMS<3 pix OR this is a first frame to image a chessboard) than update images collection with the current image
Finally, return the solution that comes out from all frames captured so far.

Optionally, the following pseudo code is used for calculating extrinsic parameters:
BEGIN
For each original distorted image:
1. Find distorted features.
2. For each feature (e.g. corners of the chess board) undistorted location is calculated using the distortion coefficients (from the intrinsic parameters).
3. Match all features (with undistorted feature point locations).
4. Solve extrinsic orientation using bundle adjustment on the match received from step 3.
5. Calculate root mean square (RMS) of a received solution to step 4 (optionally, a frame is added only when the RMS is above a threshold).
6. Rotate imagers so that a desired 'forward camera' rotation matrix is $I_{3\times3}$.
END Optionally, 2-5 are executed using standard computer vision routines, using the intrinsic parameters of the respective imager calculated during the calibration process.

Optionally, when imagers are arranged in pairs, each imager is calibrated separately. For instance, when 8 imagers are used, the calibration process is executed on 4 even (left) imagers and then on 4 odd (right) imagers. The $0^{th}$ imager may be added artificially and temporarily to the odd imagers for calibration. This way, both even and odd imagers having a common field of view.

Reference is now made, once again, to FIG. 1. The figure describes an iterative process wherein sets of frames which are received sequentially. Each set of frames optionally includes frames captured simultaneously or substantially simultaneously (e.g. with minor technical time drift) by a plurality of imagers mounted around a common center, for instance using the arrangements described above, for instance using the system depicted in FIG. 2 and optionally any of the arrangements depicted in FIG. 3A. This allows creating a VR file having a plurality of sequential panoramic frames for the creation and viewing of photographically-captured panoramas and the exploration of objects through images taken at multiple viewing angles. The panoramic frame or image (referred to interchangeably) is optionally a VR Panorama frame which documents the environment surrounding a center area to emulate an environment around a viewer (inside, looking out), yielding a sense of place and optionally changes in the place over time.

In each iteration, as shown at 102, a set of frames is captured simultaneously (a term used herein for describing also substantially simultaneously, for instance with a minor time deviation of less than 1 second) at multiple viewing angles, for example as described above, for instance using a system as depicted in FIG. 2 and/or an arrangement as depicted in FIG. 3A.

As shown at 104, each frame may be preprocessed.

As shown at 106, an estimated overlapping area is identified for each pair of frames captured by neighboring imagers. For example, when 1-8 imagers are arranged around a circle, an estimated overlap is identified for a pair of frames captured simultaneously by imagers 1 and 2, a pair of frames captured simultaneously by imagers 1 and 2, a pair of frames captured simultaneously by imagers 2 and 3, a pair of frames captured simultaneously by imagers 3 and 4, a pair of frames captured simultaneously by imagers 4 and 5, a pair of frames captured simultaneously by imagers 5 and 6, a pair of frames captured simultaneously by imagers 6 and 7, a pair of frames captured simultaneously by imagers 7 and 8, and a pair of frames captured simultaneously by imagers 8 and 1. The estimated overlapping area depicts a portion of an environment surrounding a center region, for instance the above described center region, which is described in one or more other frames captured simultaneously by other imagers.

Optionally, the overlapping areas are calculated using the above described camera calibration model. Optionally, coordinates of edges of an overlapping area between a pair of frames captured using neighboring imagers (e.g. an imager of the VR imaging device which is paired with another imager of the VR imaging device located closer to it clockwise or closer to it anti-clockwise more than any other imager) as follows:

1. Calculating a fish-eye correction matrix (e.g. a lookup table, specifying corrected coordinates of every pixel) based on the intrinsic parameters of each imager (e.g. calculated as described above).

2. Calculating an extrinsic camera calibration matrix that maps pixels of a frame (one or more pixels may be referred to herein as a region of a frame), to corrected coordinates according to the pan (yaw), tilt (pitch) and roll angles of imager(s) based on extrinsic parameters (e.g. calculated as described above).

3. Calculating a combined matrix (e.g. lookup table) is calculated by combining the fish-eye correction matrix and the extrinsic camera calibration matrix. The combined calibration matrix is used for the correction of fish eye and correction of perspective and optionally defines a location shift for each pixel.

4. Projecting the paired frames onto a sphere so that each pixel is connected to the center region with a ray (e.g. sphere radius) and/or a 3D vector.

5. Correcting the rays and/or 3D vectors according to the combined calibration matrix.

6. Identifying the overlapping area based on the corrected rays and/or 3D vectors where corrected rays of the paired frames are compared and rays having similar values (approximately "point in the same direction") define the overlapping area.

As shown at 108, a shift axis, for example a straight line that crosses the centers of each pair of frames, is identified between centers of each pair frames for which an overlapping area was calculated. The coordinates of each center is optionally calculated to be in the middle of X-axis and in the middle of the Y axis of each frame.

Now, as shown at 110, a motion gradient is calculated for each overlapping area along the respective shift axis. The motion gradient allows defining weights given to pixel(s) value shift based on the calculated global and/or local motion. The values of the motion gradient are defined as a function of a distance from lateral edges of the overlapping area. The closer a pixel, or a cluster of pixel of the overlapping area, is to a lateral edge of an overlapping area, a value indicative of less motion is assigned to it. In such a manner, when a shift function which is based on the values of the motion gradient is applied on a pixel (or a cluster of pixels near the edges of the overlapping area) the pixel is shifted less than another pixel (or another cluster of pixels) which is located at the center of the overlapping area or more proximate to the center of the overlapping area. For instance, a maximum shift (e.g. pixel at the most remote location from the center of the overlapping area) may be defined as 1/n where n is selected based on a user input (e.g. between 1 and 100) in reaction to optional values. For example, n is defined between 1 and 100 to create 100 frames and user(s) vote for each one of the frames to allow selecting a desired n value.

Now, as shown at 112, the overlapping areas in the frames are processed, each based on the respective motion gradient. For example reference is now made to FIG. 4, which is a schematic imaging the estimated overlapping area 402 and axis 404 extending between two centers 406 of neighboring imagers that acquired the neighboring frames 408A 408B being adapted for stitching, in accordance with some embodiments of the present invention. In FIG. 4, pixels of frame 1 (408A on the left) that are located within the overlapping area are shifted using the motion gradient, for example as following:

The left-most pixels, located on the left-side border of the overlapping area remain in place.

Pixels that are further away are shifted such that the further way they are from the left-most edge the more they are shifted, for example according the value of "n".

Pixels of frame 2 (408B on the right) are shifted in the opposite direction using a similar dependency on a distance from the edges of the overlapping area, in this case the right-most edge.

Now, as shown at 114, the overlapping area is post-processed. Optionally, holes formed by the shifting are treated, for instance closed based on a regular interpolation of neighboring pixels.

At 116, the adapted frames are stitched into a panoramic frame imaging an environment surrounding, at least partly, the common center. The stitching is based on the adapted overlapping area. The panoramic frame may be a spherical panorama frame imaging the environment around the common center. The stitching is optionally performed as described in co-filed application titled adaptive stitching of frames in the process of creating a panoramic frame of the same inventors.

As shown at 118 and 120, 102-116 are repeated for adapting respective the at least one estimated overlapping areas of pairs of frames of each of a plurality of sequentially captured sets of frames for creating a VR file.

As shown at 122, this allows outputting the VR file.

Figure 5A:
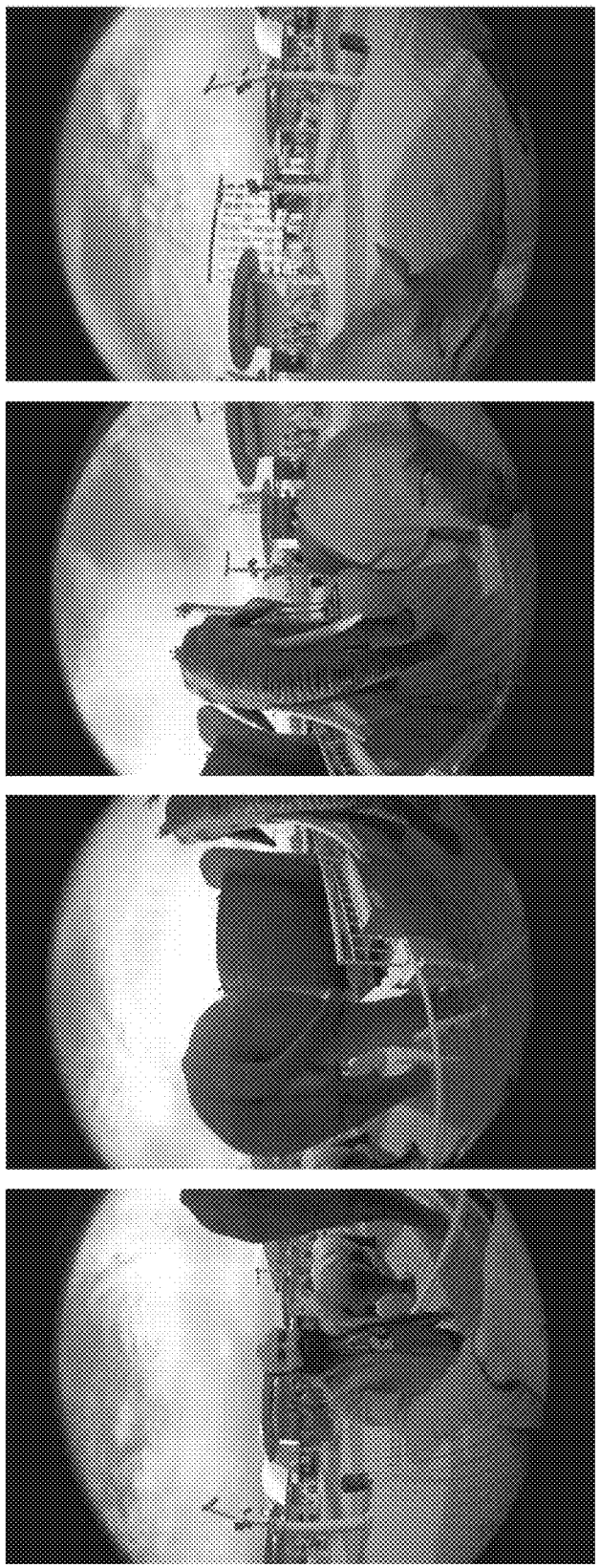
FIGS. 5A-5C are exemplary images imaging the process of acquiring frames captured at multiple viewing angles, adapting the frames, and the created panoramic frame, in accordance with some embodiments of the present invention.
Figure 5B:
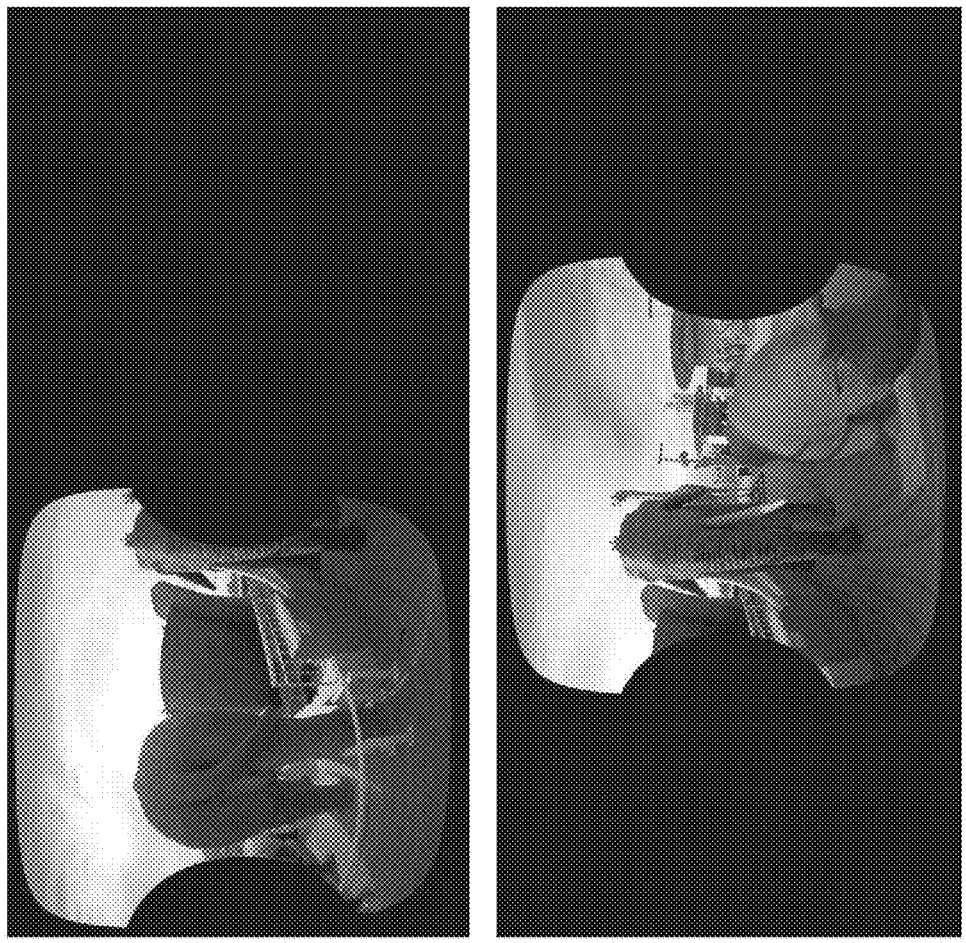
Figure 5C:
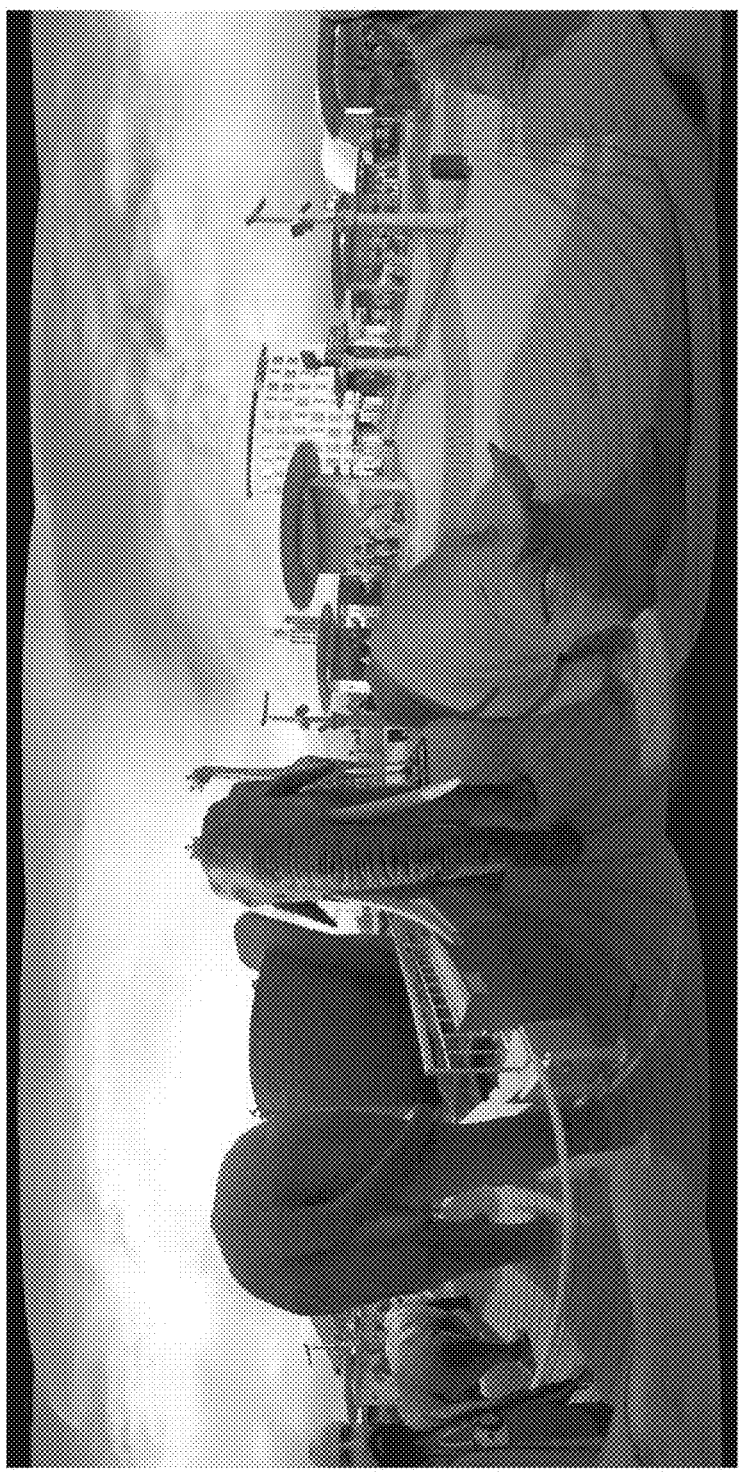

Reference is now made to FIGS. 5A-5C, which are exemplary frames imaging the process of wherein frames captured by imagers at multiple viewing angles are stitched for the created panoramic frame according to the method depicted in FIG. 1 and using system 200.

FIG. 5A is a set of exemplary frames acquired by imagers 212. The four individual frames are acquired by four different imagers 212 arranged as depicted in implementation 304 of FIG. 3A. The four frames may be used for the left or right eye (captured by one set of other imagers of each corresponding pair of imagers). FIG. 5B depicts the adapted frames created by adapting the corresponding frames shown in FIG. 5A, as described with reference to blocks 104-114 of FIG. 1. FIG. 5C depicts the panoramic frame created by stitching the adapted frames of FIG. 5B, as described with reference to block 116 of FIG. 1.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant imagers will be developed and the scope of the term frame is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of stitching a plurality of frames captured at multiple viewing angles by a plurality of imagers mounted around a common center into a panoramic frame imaging, at least partly, an environment surrounding said common center, comprising:
    receiving a set of a plurality of frames, each of the plurality of frames is captured a different viewing angle from other frames of the plurality of frames by one of a plurality of imagers mounted around a common center region to image an environment surrounding said common center region;
    providing a plurality of calibration models each is calculated based on one or more intrinsic parameters of one of said plurality of imagers;
    identifying in each of a plurality of pairs of neighboring frames from said plurality of frames at least one overlapping area using at least some of the plurality of calibration models, each said pair of neighboring frames comprises frames captured about the same time by two imagers from said plurality of imagers, said two imagers having overlapping fields of view;
    for each said at least one overlapping area:
        identifying a center connecting axis connecting between centers of respective said pair of neighboring frames;
        calculating a motion gradient for each frame of said pair of neighboring frames;
        adapting pixels of said pair of neighboring frames in said at least one overlapping area based on corresponding values from said motion gradient along said center connecting axis; and
        stitching said pair of adapted neighboring frames into a panoramic frame which at least partly imaging an environment surrounding said common center;
    wherein each of the one or more intrinsic parameters is selected from a group consisting of a principal point parameter, a focal length parameter, and a fisheye distortion parameter
    wherein at least one of said plurality of calibration models comprises a fish-eye correction matrix and an extrinsic camera calibration matrix which map coordinates of pixels to corrected coordinates defined according to symmetry axes of an image plane of respective said imager;
    wherein, in each of said plurality of frames, said at least one overlapping area is calculated based on a combined matrix generated according to said fish-eye correction matrix and said extrinsic camera calibration matrix are combined into a combined matrix used for calculating said at least one overlapping area overlap between each two consequent frames by projecting them onto a sphere so that each pixel becomes a 3D vector and correcting the 3D vectors according to the combined, full calibration matrix.

2. The method of claim 1, wherein said panoramic frame is a left eye panoramic frame and said plurality of imagers are intertwined with a plurality of additional imagers capturing a plurality of additional frames which are combined into a right eye panoramic frame;
    further comprising combining said right eye panoramic frame with said left eye panoramic frame for creating a stereoscopic frame.

3. The method of claim 2, wherein members of said plurality of imagers and said plurality of additional frames are alternately arranged along a virtual circle encircling said common center.

4. The method of claim 1, wherein said panoramic frame is a right eye panoramic frame and said plurality of imagers are intertwined with a plurality of additional imagers capturing a plurality of additional frames which are combined into a left eye panoramic frame;
further comprising combining said left eye panoramic frame with said right eye panoramic frame for creating a stereoscopic frame.

5. The method of claim 1, wherein said plurality of imagers are arranged along a virtual circle encircling said common center; wherein each one of said plurality of imagers is mounted such that an optical axis thereof is tilted in relation to an axis passing through said common center and a tangential point of an origin of a field of view of a respective said imager.

6. The method of claim 1, wherein said panoramic frame is a 360 degrees spherical panorama frame imaging said environment around said common center.

7. The method of claim 6, wherein said panoramic frame is used as one of two of frames comprising a stereoscopic frame.

8. The method of claim 1, wherein said method is repeated for adapting respective said at least one overlapping area in each frame of each of a plurality of sequentially captured sets.

9. The method of claim 1, further comprising estimating a projection of a visual representation of said plurality of frames onto a sphere skeleton.

10. The method of claim 1, wherein each one of said plurality of imagers is a camera comprising a fish eye lens.

11. The method of claim 1, wherein each one of said plurality of imagers is calibrated using a Camera-Rig Calibration.

12. The method of claim 1, wherein said adapting comprises shifting pixels located in said overlapping area towards a lateral edge of a respective said frame along said respective said axis.

13. The method of claim 12, further comprising correcting a plurality of blank pixels formed as an outcome of said shifting by interpolation.

14. A system of stitching a plurality of frames captured at multiple viewing angles by a plurality of imagers mounted around a common center into a panoramic frame imaging, at least partly, an environment surrounding said common center, comprising:
an interface adapted to receive a set of a plurality of frames, each of the plurality of frames is captured about the same time as other frames of the plurality of frames at a different viewing angle from the other frames of the plurality of frames by a plurality of imagers mounted around a common center region to image an environment surrounding said common center region;
a code store adapted to store a code;
a processor adapted to execute said code for:
providing access to a plurality of calibration models each is calculated based on one or more intrinsic parameters of one of said plurality of imagers;
identifying in each of a plurality of pairs of neighboring frames from said plurality of frames at least one overlapping area using at least some of the plurality of calibration models, each said pair of neighboring frames comprises frames captured about the same time by two imagers from said plurality of imagers, said two imagers having overlapping fields of view;
for each said at least one overlapping area:
identifying a center connecting axis connecting between centers of respective said pair of neighboring frames;
calculating a motion gradient for each frame of said pair of neighboring frames;
adapting pixels of said pair of neighboring frames in said at least one overlapping area based on corresponding values from said motion gradient along said center connecting axis; and
stitching said pair of adapted neighboring frames into a panoramic frame which at least partly imaging an environment surrounding said common center;
wherein each of the one or more intrinsic parameters is selected from a group consisting of a principal point parameter, a focal length parameter, and a fisheye distortion parameter;
wherein at least one of said plurality of calibration models comprises a fish-eye correction matrix and an extrinsic camera calibration matrix which map coordinates of pixels to corrected coordinates defined according to symmetry axes of an image plane of respective said imager;
wherein, in each of said plurality of frames, said at least one overlapping area is calculated based on a combined matrix generated according to said fish-eye correction matrix and said extrinsic camera calibration matrix are combined into a combined matrix used for calculating said at least one overlapping area overlap between each two consequent frames by projecting them onto a sphere so that each pixel becomes a 3D vector and correcting the 3D vectors according to the combined, full calibration matrix.

15. The system of claim 14, wherein said plurality of imagers are mounted on the lateral sides of a housing of a virtual reality imaging device.

16. A software program product for stitching a plurality of frames captured at multiple viewing angles by a plurality of imagers mounted around a common center into a panoramic frame imaging, at least partly, an environment surrounding said common center, comprising:
a non-transitory computer readable storage medium;
first program instructions for receiving a set of a plurality of frames, each of the plurality of frames is captured at a different viewing angle from other frames by a plurality of imagers mounted around a common center region to image an environment surrounding said common center region;
second program instructions for providing a plurality of calibration models each is calculated based on one or more intrinsic parameters of one of said plurality of imagers;
third program instructions for identifying in each of a plurality of pairs of neighboring frames from said plurality of frames at least one overlapping area using at least some of the plurality of calibration models, each said pair of neighboring frames comprises frames captured about the same time by two imagers from said plurality of imagers, said two imagers having overlapping fields of view;
fourth program instructions for performing the following for each said at least one overlapping area:
identifying a center connecting axis connecting between centers of respective said pair of neighboring frames;
calculating a motion gradient for each frame of said pair of neighboring frames;
adapting pixels of said pair of neighboring frames in said at least one overlapping area based on corresponding values from said motion gradient along said center connecting axis; and stitching said pair of adapted neighboring frames into a panoramic frame which at least partly imaging an environment surrounding said common center;

wherein each of the one or more intrinsic parameters is selected from a group consisting of a principal point parameter, a focal length parameter, and a fisheye distortion parameter;

wherein said first, second, third, and fourth program instructions are executed by at least one computerized processor from said non-transitory computer readable storage medium;

wherein at least one of said plurality of calibration models comprises a fish-eye correction matrix and an extrinsic camera calibration matrix which map coordinates of pixels to corrected coordinates defined according to symmetry axes of an image plane of respective said imager;

wherein, in each of said plurality of frames, said at least one overlapping area is calculated based on a combined matrix generated according to said fish-eye correction matrix and said extrinsic camera calibration matrix are combined into a combined matrix used for calculating said at least one overlapping area overlap between each two consequent frames by projecting them onto a sphere so that each pixel becomes a 3D vector and correcting the 3D vectors according to the combined, full calibration matrix.

* * * * *